Nov. 4, 1958 R. B. KOCH 2,858,590
TUBING DEVICE
Filed Feb. 18, 1957

INVENTOR
*Robert B. Koch*

BY *Robert C. Sullivan*

ATTORNEY

United States Patent Office 2,858,590
Patented Nov. 4, 1958

2,858,590

TUBING DEVICE

Robert B. Koch, Reading, Pa., assignor to The Polymer Corporation, a corporation of Pennsylvania Application February 18, 1957, Serial No. 640,845

7 Claims. (Cl. 24—81)

This invention relates to devices for maintaining bends in resilient tubing and the like, and more particularly to a quickly detachable clip device for this purpose.

Plastic tubing, such as nylon tubing, for example, is gaining wide acceptance in many installations where metal tubing formerly would have been used. For example, nylon tubing is being used as a fluid conduit in automatic lubrication systems for automotive vehicles and other machines, as well as in hydraulic or pneumatic control or positioning systems.

In the various installations where resilient plastic tubing is used, it is frequently necessary that the tubing be bent at certain definite locations and at definite angles in order to connect components of the system in which it is used. The maintenance of bends at particular locations is often important in order to provide that the tubing shall be positioned in a particular location to avoid interference with other components, or in order to avoid mechanical contact or friction with other components. Another very important reason for locating the bends with certainty at particular portions of the tubing is for neatness and orderliness in appearance of the apparatus. This is particularly important for complicated hydraulic control apparatus employing many different hydraulic connections and "circuits." In order to properly distribute the bending stress, the bend in the resilient tubing should be distributed over an arc at a minimum radius rather than occurring as a sharp bend at one point. This is especially important when the tubing is used in high pressure fluid systems, since sharply bent resilient tubing is liable to fail at the bend under high pressures. A sharp bend will also tend to fold and close the tubing so that it is not an efficient fluid conduit.

Previously known devices for application to the exterior of tubing have been relatively difficult to attach to the tubing, generally requiring axial threading of the tubing through the device, or deformation of portions of the device to hold the assembled relationship.

Accordingly, it is an object of this invention to provide a device for maintaining a bend in resilient tubing which uniformly distributes bending stresses in the tubing.

It is another object of this invention to provide a clip device for maintaining a bend in a resilient tubing while preventing any substantial collapse of the tubing which might seriously impede the flow of fluid therethrough.

It is another object of this invention to provide a clip device for maintaining a bend in a resilient elongated body which is easily installed on the body without the necessity of axially threading the body through the device.

Another object of this invention is to provide a clip device for maintaining a bend in a resilient elongated body which is easily installed without forming or bending any part of the device in order to maintain the assembled relationship.

It is still another object of the invention to provide a clip device for maintaining a bend in a resilient tubing which may be easily installed on the tubing after all connections of the tubing into the system in which it is used have been completed.

In carrying out the objects of this invention in one preferred embodiment thereof, the clip device is in the form of a rigid structure formed from sheet metal which is permanently curved to conform to the desired bend in the resilient tubing. The body of the clip device is also curved transversely to the desired bend in the resilient tubing to embrace the portion of the outer surface of the resilient tubing facing radially inwardly from the bend. This feature may also be described as a radially outwardly facing channel. At the ends of the portion of the clip device defining the curve of the desired bend in the resilient tubing, the direction of the opening of the channel gradually changes to a direction parallel to the axis of the tubing bend and eventually to a direction facing slightly radially inwardly from the direction parallel to the axis. The resulting outermost terminal portions of the clip device therefore form ears which engage the radially outermost portions of the tubing to hold the resilient tubing in the bent or curved position. The force of the resilience of the tubing tending to straighten the bend holds the tubing in engagement with the ears and with the intermediate channel portions of the body of the device to maintain the device in assembled relationship with the tubing without the need for any other fastening arrangement. An important feature of the construction is that the channel is open along its entire length to permit insertion of the tubing into the channel without the necessity of threading the tubing into the clip, and permitting positioning of the clip on the tubing after all connections of the tubing have been completed. Similarly, the clip may be rapidly and easily removed without disconnecting the tubing.

Further objects and advantages of the invention will become apparent from the following description taken in conjunction with the accompanying drawing having the following figures.

Figure 1:
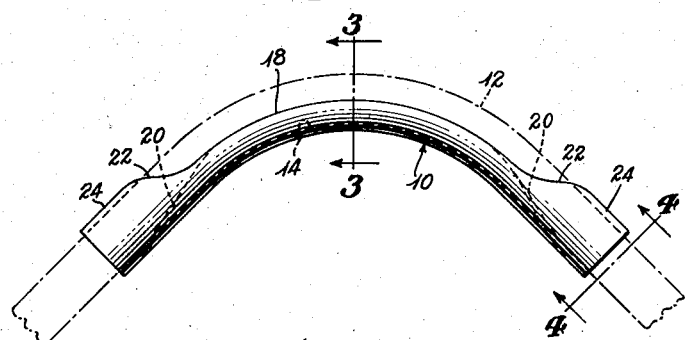
Fig. 1 is a side elevation view showing a preferred embodiment of the clip device of the invention in assembled relationship with a resilient tube for maintaining a bend in the tube. The tube is shown in dotted outline and the view is in an axial direction with respect to the tube bend.
Figure 5:
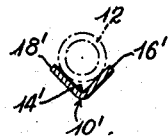
Fig. 5 is a view in section of a resilient tube assembled with a clip device of modified shape taken along a section line corresponding to section 3—3 of Fig. 1.
Figure 6:

And Fig. 6 is a view in section of a resilient tube assembled with the modified clip device of Fig. 5 taken along a line corresponding to line 4—4 of Fig. 1.

Referring now to the drawing, the clip device is generally indicated at 10 and is preferably made of a suitable sheet metal, such as steel. Clip 10 maintains a bend in a resilient tube 12 to which it is attached. Tube 12 may be, for example, a nylon tube connected in a hydraulic control system. Clip 10 is curved as indicated in Fig. 1 to conform to the desired bend of the tubing to which it is to be assembled, and in the illustrated embodiment is curved for assembly to a flexible tubing whose straight portions on either side of the bend are to lie at right angles to each other. It is understood that other angles of curvature can be provided as desired.

Figure 2:
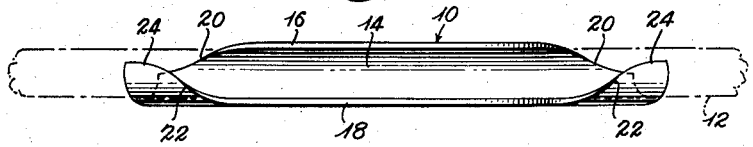
Fig. 2 is a top plan view of the support clip of Fig. 1.
Figure 3:
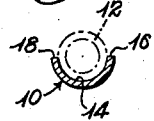
Fig. 3 is a view in transverse section along line 3—3 of Fig. 1.

Clip 10 includes an open channel 14 which extends for the entire length of the clip, the channel being bounded by edges 16 and 18 of the clip body. Channel 14 is of substantially semicircular cross section, as best seen in Fig. 3, and the inside surface of channel 14 lies along the inner radius of the bend of tubing 12. For most of the length of the clip, each of the edges 16 and 18 extends an equal radial distance from the inner radius of curvature of the clip. However, adjacent each end of the clip, edges 16 and 18 are spiraled equally in opposite radial directions. Thus, as best seen in Fig. 2, adjacent each end of the clip, edge 16 spirals radially inwardly toward the inner radius of the bend as indicated at 20 while edge 18 spirals radially outwardly toward the outer radius of the bend, as indicated at 22.

Due to the opposite direction of spiraling of edges 16 and 18 at the ends of the clip, the distance between the edges remains substantially constant and is such as to continuously provide an access opening to channel 14 of sufficient dimension to permit radial insertion of tubing 12 into the channel. The radially outward spiraling of edge 18 at the opposite ends of the clip defines a pair of ears 24 which overlie the radially outer surface of tubing 12 and thereby retain the tubing and the clip 10 properly assembled against the straightening forces arising from the resilience of the tube.

In using clip 10, tubing 12 is radially inserted into channel 14 and is bent slightly farther than the desired bend to be maintained so that the portions at the ends of the clip can be slipped under the ears 24 and through the spiral opening defined by spiral portions 20 and 22 of edges 16 and 18. Once tubing 12 has thus been positioned in channel 14, ears 24 then securely retain the resilient tubing in position in the clip. The tube may be quickly removed if desired by slightly increasing the bend of the tubing adjacent the ends of the clip to clear ears 24.

While the opposite ends of the respective edges 16 and 18 are spiraled in the same direction in the illustrated embodiment, thereby causing ears 24 to extend in the same direction, the direction of spiraling at opposite ends of the clip could be reversed if desired to cause ears 24 at opposite ends of the clip to extend in opposite directions.

Figure 4:
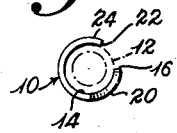
Fig. 4 is a view in transverse section long line 4—4 of Fig. 1.

There is shown in Figs. 5 and 6 a modified embodiment of clip which is generally similar to the clip just described but in which the channel of the body member is of V-shape in cross section rather than of semicircular shape in cross section for most of its length. Figs. 5 and 6 indicate portions of the modified clip corresponding to the portions of the previous clip respectively shown by Figs. 3 and 4. The modified clip is generally indicated at 10' and includes opposite edges 16' and 18' which bound the opening of the channel 14' into which tubing 12 is radially inserted. At each end of the clip, edges 16' and 18' are spiraled in opposite directions in the same manner previously described in connection with the embodiment of Figs. 1-4 to provide a spiral channel opening of substantially constant width to receive the radially inserted tubing. Spiral edges 22' at each end of the clip define ear portions 24 which overlie the portions of tubing 12 at the ends of the clip and retain it securely assembled to the clip.

It will be seen from the above description that whether the channel is of semicircular cross-sectional shape or of a V-shape, the tube which is assembled with the clip device is embraced by the sides of the channel. It is generally preferred that the channel should embrace a substantial portion of the circumference of the tubing. This is particularly important when sharp bends are to be maintained in a tubing which has a tendency to collapse at the bend. In such instance, the embodiment shown in Figs. 1-4 is preferred, as the embracing portions of the channel near the edges 16 and 18 exert lateral forces on the sides of the tubing at the bend. If the tubing tends to collapse, it tends to form an elliptical shape in cross section, in which the vertical axis as shown in Fig. 3 would be foreshortened and the horizontal axis would be expanded. However, with the confining action provided by the embracing edges of the channel, the expanding action of the horizontal axis of the tube is substantially prevented so that the tube cannot truly flatten and foreshorten the vertical axis. Thus, there is no substantial reduction in interior cross-sectional area to cause a constriction of flow.

From the above description it is apparent that some of the most important elements of this invention are the provision of a radially outwardly facing channel portion to engage the tubing at the inner radius of curvature of the tubing bend, and ear portions at the ends of the clip device to embrace portions of the tubing at the outer radius of curvature of the bend to maintain the assembled relationship of the clip device and the resilient tubing. Sufficient openings must be provided in the device in the vicinity of the ears and also in the vicinity of the curved channel portion embracing the inner radius of the bend of the tube in order to permit ease of assembly and disassembly of the tubing and the clip without any necessity for threading the tubing through the clip.

Thus, the clip device of this invention may be described as incorporating a channeled intermediate body portion which might be identified by reference to Figs. 1 and 2 as extending generally between the positions where the side edges 16 and 18 of the channel begin to spiral as indicated at 20 and 22; and end portions including the respective overlying ears 24. Thus, the clip device may be briefly described as including a curved body portion having a longitudinal channel therein facing radially outward with respect to the curve, and end portions at the respective ends of the channel portion including overlying ears.

While the invention has been described by reference to Figs. 1 and 2 of the drawing with the clip member generally arranged beneath the tubing to which it is assembled, it will be understood that the clip member is securely attachable to the tubing in almost any position or attitude with respect to the tubing. When a tubing of a highly resilient material such as nylon is employed with the clip member, the forces holding the clip member and the tubing in assembled relationship are quire strong and, accordingly, it is permissible to employ the clip member in apparatus which is movable such as vehicles in which the position and attitude may be changed and in which the assembly may even be subjected to mechanical vibration and shock conditions.

It can be seen from the foregoing that the clip device as hereinbefore described has great utility for maintaining bends in the resilient tubing. This device engages the tubing along the inner radius of the bend for the entire length of the bend, and thereby provides a distribution of bending stress which tends to prevent failure of the tubing at the bend, particularly under high pressure conditions. Furthermore, the clips of the invention are very easily installed on resilient tubing and may be installed at the various locations where it is desired to establish bends after all connections of the tubing have been completed. The construction of the clip permits simple radial insertion of the tubing into the clip and does not require any bending or forming of any parts of the clip after the tubing has been received in the clip in order to secure the tubing in position.

The clip devices herein described are particularly useful in maintaining bends in resilient fluid carrying tubes and are so described, but they would obviously be useful in maintaining bends in other resilient members such as electrical conductors.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

The embodiments of the invention in which an exclusive property or privilege is claimed are defined as follows:

1. A quick detachable clip device adapted for maintaining a bend in a resilient elongated body, comprising a channel portion including a channel facing radially outwardly with respect to the radius of curvature of the desired bend, end portions positioned at the respective ends of said channel portion, each of said end portions including an overlying ear for at least partially embracing the radially outermost portion of the resilient body when bent and positioned in said channel, said clip device having an opening extending for the entire length thereof along said channel portion and said end portions, said opening having a minimum dimension sufficient to permit radial insertion of the resilient body when the resilient body is in a bent condition.

2. A quick detachable clip device adapted for maintaining a bend of a minimum radius in a resilient elongated cylindrical body, comprising a channel portion curved to conform to the radius of the desired bend and including a channel facing radially outwardly with respect to the radius of curvature of the desired bend, end portions positioned at the respective ends of said channel portion, each of said end portions including an overlying ear for at least partially embracing the radially outermost portion of the resilient cylindrical body when bent and positioned in said channel, said clip device having a continuous opening extending for the entire length thereof along said channel portion and said end portions, said opening having a minimum dimension corresponding to the outside diameter of the resilient cylindrical body.

3. A clip adapted for maintaining a bend in a resilient tubing, comprising a channeled body curved to conform to the desired bend in the tubing, the channel of said body facing radially outwardly with respect to the radius of the desired bend, said clip having an opening extending for the entire length thereof bounded by opposite edges of said body to permit radial introduction of a resilient tubing into said channel, and a retaining ear at each end of said body extending from one of said opposite edges for overlying relation to a bent resilient tubing positioned in said channel, the other of said opposite edges being spaced a sufficient distance from said retaining ear to permit free radial introduction of the tubing into said clip in the region of said retaining ear.

4. A clip adapted for maintaining a bend in a resilient tubing, comprising a channeled body curved to conform to the desired bend in the tubing, the channel of said body facing radially outwardly with respect to the radius of the desired bend, said clip having an opening extending for the entire length thereof bounded by opposite edges of said body to permit radial introduction of a resilient tubing into said body, said opposite edges being arranged in the form of a spiral at each end of said clip to define an opening which permits free radial introduction of the tubing at said ends, one of the spiraled edges at each end of said clip defining a body portion positioned for overlying relation to a bent resilient tubing positioned in said channel.

5. A quick detachable clip device adapted for maintaining a bend of a minimum radius in a resilient tubing, comprising a channel portion curved to conform to the radius of the desired bend and having a channel facing radially outwardly with respect to the radius of curvature of the desired bend, end portions positioned at the respective ends of said channel portion, each of said end portions including a single overlying ear for embracing the radially outermost portion of the resilient tubing when bent and positioned in said channel, said clip device having an opening extending for the entire length thereof opposite said channel and through said end portions, said opening having a minimum dimension corresponding to the outside diameter of the resilient tubing.

6. A quick detachable clip device adapted for maintaining a bend of a minimum radius in a resilient tubing, comprising a channel portion curved to conform to the radius of the desired bend and including a channel facing radially outwardly with respect to the radius of curvature of the desired bend, said channel having a V-shape in transverse cross section, end portions positioned at the respective ends of said channel portion, each of said end portions including a single overlying ear for embracing the radially outermost portion of the resilient tubing when bent and positioned in said channel, said clip device having an opening extending for the entire length thereof opposite said channel and through said end portions, said opening having a minimum dimension corresponding to the outside diameter of the resilient tubing.

7. A quick detachable clip device adapted for maintaining a bend of a minimum radius in a resilient tubing, comprising a channel portion curved to conform to the radius of the desired bend and including a channel facing radially outwardly with respect to the radius of curvature of the desired bend, said channel having an arcuate shape in transverse cross section to conform substantially to a portion of the outer circumference of the resilient tubing, end portions positioned at the respective ends of said channel portion, each of said end portions including a single overlying ear for embracing the radially outermost portion of the resilient tubing when bent and positioned in said channel, said clip device having an opening extending for the entire length thereof opposite said channel and through said end portions, said opening having a minimum dimension corresponding to the outside diameter of the resilient tubing.

References Cited in the file of this patent

UNITED STATES PATENTS

| | | |
|---|---|---|
| 981,676 | Oppenheim et al. | Jan. 17, 1911 |
| 1,123,361 | Pease | Jan. 5, 1915 |